United States Patent [19]

El-Ghatta et al.

[11] 3,956,469

[45] May 11, 1976

[54] PROCESS FOR PREPARING CATALYSTS CONTAINING PLATINUM METAL

[75] Inventors: Hussain El-Ghatta, Chur, Grisons; Johann Karl Forrer, Domat-ems, Grisons, both of Switzerland

[73] Assignee: Inventa AG fur Forschung und Patentverwertung, Zurich, Switzerland

[22] Filed: Oct. 7, 1974

[21] Appl. No.: 512,640

[30] Foreign Application Priority Data

Oct. 10, 1973 Switzerland.................. 14457/73

[52] U.S. Cl................................ 423/387; 252/472
[51] Int. Cl.².................. C01B 21/14; B01J 23/42
[58] Field of Search.................... 252/472; 423/387

[56] References Cited
UNITED STATES PATENTS
3,295,925   1/1967   Füeg et al............................ 423/387

Primary Examiner—W. J. Shine
Attorney, Agent, or Firm—Jordan B. Bierman; Linda Bierman; Kenneth J. Stempler

[57] ABSTRACT

A process is disclosed whereby an improved platinum metal-containing catalyst is prepared. Standard platinum metal catalysts are treated with sulfur compounds which liberate sulfurous acid in acid media. The sulfur compounds contain 15 to 150 atom % of sulfur based on the platinum metal present. The treatment is conducted in the presence of hydroxylammonium salts in acid media and in the absence of reducing agents which are capable of reducing sulfurous acid to sulfide.

6 Claims, No Drawings

PROCESS FOR PREPARING CATALYSTS CONTAINING PLATINUM METAL

The present invention relates to new types of catalysts containing platinum metal, a process for their preparation and the use of these catalysts for the preparation of hydroxylammonium salts through catalytic hydrogenation of nitrogen monoxide in acid medium.

It is known that catalysts containing platinum metal catalyze the hydrogenation of nitrogen monoxide in acid media to hydroxylammonium salts. In addition to the desired hydroxylammonium salts a part of the nitrogen monoxide is reduced to ammonium salts, nitrogen and laughing gas. These undesired side products reduce the yield of hydroxylamine and adversely affect the economics of the process.

Proposed methods which permit a more selective reduction of nitrogen monoxide to hydroxylamine in acid media with the use of catalysts containing platinum metal are known, and consist, among other things, in poisoning the catalysts with the elements As, Se, Sb, Te, S or Bi according to German Patent No. 956,038, and with the elements Hg, As, Sb, Bi according to Japanese Patent No. 54,750/1966.

It has now been found that during the treatment of catalysts containing platinum metal with salts of sulfurous acid or with sulfur compounds which liberate sulfurous acid under the influence of acids and in the presence of hydroxylammonium salts in acid media in the absence of reducing agents which are capable of reducing the sulfurous acid to sulfide (such as formic acid and hydrogen), catalysts are obtained which permit the hydrogenation of nitrogen monoxide to hydroxylammonium salts with a surprisingly higher degree of selectivity and activity than untreated Pt catalysts.

Accordingly, the present invention relates to a process for the preparation of catalysts containing platinum metal. The process is characterized in that these catalysts are treated with sulfur compounds containing 15 to 150 atom % of sulfur based on the amount of platinum metal, and which liberate sulfurous acid in acid media, in the presence of hydroxylammonium salts in acid media and in the absence of reducing agents which are capable of reducing sulfurous acid to sulfide.

The usual preparations, such as platinum on activated charcoal or graphite, come into primary consideration as catalysts. However, other catalytic platinum preparations may also be used.

According to the invention the catalysts containing platinum metal may also be treated first with the sulfur compounds in acid medium and then with the hydroxylammonium salts. But in any case, the absence of reducing agents is a necessary requirement, in order to obtain the desired catalyst activities and selectivities.

After treatment the catalysts may be isolated in the usual manner, or may be used immediately after the treatment in their reaction medium, particularly for the catalytic hydrogenation of nitrogen monoxide to hydroxylamine in acid solution.

Sulfur compounds which liberate $H_2SO_3$ in an acid medium, usable in the present invention, include the salts of sulfurous acid, dithionous acid and thiosulfuric acid. By preference the alkali metal salts, particularly the sodium salts, are used in each case.

The quantity of sulfur compounds to be added is preferably 30 to 100 atom % of sulfur, based on the amount of platinum metal in the catalyst.

The catalysts may be conveniently treated in a solution having a concentration of 1 to 5 N hydroxylammonium salts and 0 to 5 N sulfuric acid.

The treatment is preferably carried out in a solution that is 2 to 4 N with respect to the hydroxylammonium salts in 0.5 to 2 N sulfuric acid, so that the preferred hydroxylammonium salt is hydroxylammonium sulfate.

When the catalysts are treated first with the sulfur compounds in an acid medium, then the preferred concentration of sulfuric acid is 1 to 5 N. As regards the concentration of the hydroxylammonium salts, the above-stated data are applicable.

During the treatment, the temperature is maintained between 15° and 100°C. To obtain the desired effect it is advisable to carry out the treatment for 0.1 to 15 hours, preferably 0.5 to 5 hours, before the catalyst is isolated or used directly for the reduction reaction.

The treatment of the catalyst should be carried out under an inert atmosphere such as argon or nitrogen. Special advantages which the catalysts containing platinum metal prepared according to the present invention possess in comparison with untreated catalysts are the very markedly increased activity and selectivity, especially during the hydrogenation of NO to hydroxylamine, as will become evident from the following examples.

EXAMPLE 1

A 2 liter reactor provided with a stirrer, is filled with 2 liters of an aqueous solution having the following composition:

3.1 N hydroxylammonium sulfate
0.4 N ammonium sulfate 0.1 N sulfuric acid.

7 g of 1.0% platinum on activated charcoal as carrier are added as catalyst per liter of reactor solution. The suspension is treated for 5 minutes with nitrogen gas. The substances shown in Table 1 are added in the indicated amounts, and the suspension is stirred in a $N_2$ atmosphere at 25°–30°C for the lengths of time indicated in Table 1.

After this treatment, a gas mixture consisting of about 25 liters (at STP) of nitrogen/monoxide and about 75 liters (at STP) of hydrogen is passed in per hour at 40°C. The duration of the reaction is 8 hours. The acid concentration is kept constant by removal of the product every hour and by addition of sulfuric acid (about 4.8 N).

Table 2 lists the respective activity, selectivity and yields of the treated catalysts, as well as the corresponding data for an untreated catalyst, given for reference purposes.

Table 1

| Designation of Catalyst | Additive | Additive per 100 g of Catalyst [mg] | Atom-% of sulfur based on Pt | Reaction time (hours) |
|---|---|---|---|---|
| $K_1$ | $Na_2S_2O_4.H_2O$ | 75 | 15.3 | 0.5 |
| $K_2$ | '' | 150 | 30.6 | 0.5 |
| $K_3$ | '' | 300 | 61.2 | 1 |
| $K_4$ | '' | 490 | 100 | 14 |
| $K_5$ | $Na_2S_2O_3.5H_2O$ | 196 | 30.6 | 1 |
| $K_6$ | $Na_2SO_3$ | 198.5 | 30.6 | 1 |

For comparison

| $K_0$ | Without additive | | | |
|---|---|---|---|---|
| $K_7$ | $Na_2S_2O_4.H_2O$ | | 15.0 | 3.06 | 1 |

For comparison-continued

| $K_o$ | | Without additive | | |
|---|---|---|---|---|
| $K_8$ | $Na_2S._nH_2O$ | 378 | 30.6 | 1 |

Table 2

| Designation of catalyst (from Table 1) | Moles of NO Per Hour Fed | Amount of nitrogen monoxide reacted (%) | Selectivity: g. Eq. $(NH_3OH)_2SO_4$ g. Eq. $(NH_4)_2SO_4$ | Yield (%) $(NH_3OH)_2SO_4$ | Yield (%) $(NH_4)_2SO_4$ | $N_2O/N_2$ | Volume-time Yield: $g(NH_3OH)_2SO_4$ 1 hr |
|---|---|---|---|---|---|---|---|
| $K_1$ | 1.12 | 77.6 | 4.55 | 69.0 | 15.0 | 16.0 | 24.6 |
| $K_2$ | 1.1 | 75.5 | 7.3 | 79.3 | 10.9 | 9.8 | 27.0 |
| $K_3$ | 1.08 | 82.2 | 6.88 | 78.9 | 11.5 | 9.6 | 28.7 |
| $K_4$ | 1.06 | 77.7 | 22.4 | 91.6 | 4.1 | 4.3 | 31.1 |
| $K_5$ | 1.1 | 72.7 | 6.81 | 79.4 | 11.7 | 8.9 | 26.1 |
| $K_6$ | 1.14 | 77.4 | 6.4 | 83.0 | 13.2 | 3.8 | 30.0 |

For comparison

| | | | | | | | |
|---|---|---|---|---|---|---|---|
| $K_o$ | 1.08 | 70.5 | 1.09 | 42.8 | 39.4 | 17.8 | 13.4 |
| $K_7$ | 1.1 | 72.5 | 0.5 | 27.4 | 55.0 | 17.6 | 9.0 |
| $K_8$ | 1.11 | 37.3 | 6.39 | 53.1 | 8.3 | 38.6 | 9.0 |

EXAMPLE 2

A 2 liter reactor equipped with stirrer is filled with 2 liters of an aqueous solution having the following composition:

3.1 N hydroxylammonium sulfate
0.4 N ammonium sulfate
1.0 N sulfuric acid.

7 g of 1.0% platinum on activated charcoal as carrier are added per liter of reactor solution. 490 mg of sodium dithionite ($Na_2S_2O_4.H_2O$) are added per 100 g of catalyst (corresponding to 100 atom-% of sulfur referred to platinum). The solution is then filtered off, and washed until the wash water is free of sulfate anion. The treated catalyst is used for the hydrogenation of nitrogen monoxide according to Example 1.

The activity, selectivity and yields for the treated and untreated catalysts are as follows.

| | Catalyst treated | Catalyst untreated |
|---|---|---|
| Amount of reacted NO (%) | 76.4 | 70.5 |
| Selectivity equivalents $(NH_3OH)_2SO_4$ equivalents $(NH_4)_2SO_4$ | 10.63 | 1.09 |
| Yield (%) $(NH_3OH)_2SO_4$ (%) | 78.6 | 42.8 |
| $(NH_4)_2SO_4$ (%) | 7.4 | 39.4 |
| $N_2 / N_2O$ (%) | 14.0 | 17.8 |
| Volume-time Yield: $\frac{g\ (NH_3OH)_2SO_4}{L\ .\ hr}$ | 27.6 | 13.4 |
| Moles of NO per hour fed | 1.12 | 1.08 |

EXAMPLE 3

This example shows the behavior of the treated catalysts with repeated use.

The catalyst treatment and hydrogenation of NO are carried out as in Example 1. Each run period lasted 8 hours. The catalysts were not isolated between the run periods but were left in the reactor solution.

The activity, selectivity and yields for the treated and untreated catalysts are listed in Table 3.

Table 3

| | $K_9$ [1] | | | | $K_1$ (see Table 1) | | | $K_o$ (untreated catalyst) | | |
|---|---|---|---|---|---|---|---|---|---|---|
| Run | 1 | 2 | 3 | 4 | 1 | 2 | 3 | 1 | 2 | 3 |
| Amount of NO reacted(%) | 77.2 | 74.3 | 75.0 | 70.0 | 77.6 | 73.4 | 73.5 | 70.5 | 68.4 | 69.0 |
| Selectivity: $\frac{Moles(NH_3OH)_2SO_4}{moles(NH_4)_2SO_4}$ | 16.3 | 17.4 | 41.1 | See 2) below | 4.55 | 7.24 | 8.33 | 1.09 | 1.58 | 1.98 |
| Yield (%) $(NH_3OH)_2SO_4$ (%) | 82.9 | 83.0 | 83.0 | 92 | 69.0 | 81.2 | 79.8 | 42.8 | 52.2 | 57.4 |
| $(NH_4)_2SO_4$ (%) | 5.1 | 4.77 | 2.0 | 0 | 15.0 | 11.2 | 9.6 | 39.4 | 33.0 | 29.0 |
| $N_2/N_2O$ (%) | 12 | 12.23 | 15.0 | 8 | 16.0 | 7.6 | 10.6 | 17.8 | 14.76 | 13.6 |
| Volume-time yield g $(NH_3OH)_2SO_4$/hr.l | 28.8 | 27.4 | 28.0 | 28.0 | 24.6 | 27.2 | 26.4 | 13.4 | 16.7 | 16.0 |
| Moles of NO per hour fed | 1.1 | 1.08 | 1.1 | 1.06 | 1.12 | 1.11 | 1.1 | 1.08 | 1.14 | 0.99 |

[1] Treated with 650 mg of $Na_2SO_3$ per 100 g of catalyst (100 atom-% of sulfur referred to Pt). The treatment was carried out for 14 hours at 27°C.
[2] The product consists almost entirely of hydroxylammonium sulfate.

EXAMPLE 4

This example shows the effects of reducing agents (hydrogen) on the behavior of the treated catalysts.

The catalyst treatment and subsequent hydrogenation of nitrogen monoxide were carried out analogously to Example 1. The substances were added to the reactor suspension during treatment with hydrogen gas and during treatment with the mixture of NO and $H_2$ gases.

Table 4 shows the behavior of the treated catalysts during the gas treatment in question.

Table 4

| Substance added | mg of additive 100 g catalyst | Atom-% of sulfur referred to Pt | Gas treatment during the catalyst treatment | Amount of NO reacted (%) | Yield (%) $(NH_3OH)_2SO_4$ | $(NH_4)_2SO_4$ | $N_2O/N$ |
|---|---|---|---|---|---|---|---|
| $Na_2S_2O_4.H_2O$ | 150 | 30.6 | $H_2$ | Nil | 0 | 0 | 0 |
|  | 300 | 61.2 | $H_2$ | Nil | 0 | 0 | 0 |
|  | 300 | 61.2 | $NO/H_2$ | 12 | 0 | 0 | 0 |
| $Na_2SO_3$ | 198.5 | 30.6 | $H_2$ | 60 | 50.7 | 8.8 | 40.4 |
| $Na_2S_2O_4.H_2O$ | 150 | 30.6 | $N_2$ | 75.5 | 79.3 | 10.9 | 9.8 |
|  | 300 | 61.2 | $N_2$ | 82.2 | 78.9 | 11.5 | 9.6 |
| $Na_2SO_3$ | 198.5 | 30.6 | $N_2$ | 77.4 | 83.0 | 13.2 | 3.8 |

What is claimed is:

1. A process for preparing an improved platinum metal catalyst which comprises contacting a supported platinum metal catalyst with
    a hydroxylammonium salt and a sulfur-containing compound, which liberates sulfurous acid under acidic conditions, in a mineral acid medium.
    said process being conducted substantially in the absence of reducing agents capable of reducing sulfurous acid to sulfide, said sulfur compound being present in an amount corresponding to 15 to 150 atom % sulfur based on the amount of platinum metal, said process being conducted under an atmosphere of inert gas.

2. The process of claim 1 in which the sulfur compound is a salt of sulfurous acid, dithionous acid, thiosulfuric acid or their mixtures.

3. The process of claim 1 in which the atom % of sulfur is 30 to 100.

4. The process of claim 1 in which the hydroxylammonium salt is sulfate and the medium is made acidic by means of sulfuric acid.

5. An improved platinum metal catalyst prepared by contacting a supported platinum metal catalyst with a hydroxylammonium salt and a sulfur compound, which liberates sulfurous acid under acid conditions, in a mineral acid medium, said contacting being conducted substantially in the absence of reducing agents capable of reducing sulfurous acid to sulfide, said sulfur compound being present in an amount corresponding to 15 to 150 atom % sulfur based on the amound of platinum metal, said process being conducted under an atmosphere of inert gas.

6. A method for preparing hydroxylamine which comprises hydrogenating nitrogen monoxide in the presence of the catalyst of claim 5.

* * * * *